(12) United States Patent
Herner et al.

(10) Patent No.: US 12,551,227 B2
(45) Date of Patent: Feb. 17, 2026

(54) SURGICAL INSTRUMENT, TOOL DEVICE FOR SUCH A SURGICAL INSTRUMENT, AND METHOD FOR PRODUCING SUCH A TOOL DEVICE

(71) Applicant: Aesculap AG, Tuttlingen (DE)

(72) Inventors: Eugen Herner, Villingen-Schwenningen (DE); Hannes Kizenberger, Immendingen (DE); Nikolaus Hafner, Tuttlingen (DE); Erik Walberg, Augsburg (DE)

(73) Assignee: Aesculap AG, Tuttlingen (DE)

( * ) Notice: Subject to any disclaimer, the term of this patent is extended or adjusted under 35 U.S.C. 154(b) by 372 days.

(21) Appl. No.: 18/274,109

(22) PCT Filed: Feb. 9, 2022

(86) PCT No.: PCT/EP2022/053124
§ 371 (c)(1),
(2) Date: Jul. 25, 2023

(87) PCT Pub. No.: WO2022/171668
PCT Pub. Date: Aug. 18, 2022

(65) Prior Publication Data
US 2024/0423658 A1  Dec. 26, 2024

(30) Foreign Application Priority Data

Feb. 11, 2021 (DE) ............ 10 2021 201 311.2

(51) Int. Cl.
*A61B 17/29* (2006.01)
*A61B 17/00* (2006.01)

(52) U.S. Cl.
CPC ........ *A61B 17/2909* (2013.01); *A61B 2017/00526* (2013.01); *A61B 2017/2936* (2013.01); *A61B 2017/2947* (2013.01)

(58) Field of Classification Search
CPC ......... A61B 17/28–295; A61B 18/1442–1447
(Continued)

(56) References Cited

U.S. PATENT DOCUMENTS

| 5,290,309 A | * | 3/1994 | Kothe | .............. B25B 7/14 |
| | | | | 606/207 |
| 5,919,206 A | * | 7/1999 | Gengler | .......... A61B 17/295 |
| | | | | 606/171 |

(Continued)

FOREIGN PATENT DOCUMENTS

| CN | 103429184 A | 12/2013 |
| CN | 103565515 A | 2/2014 |

(Continued)

OTHER PUBLICATIONS

Search Report received in International Application No. PCT/EP2022/053124 dated May 16, 2022, with translation, 4 pages.

(Continued)

*Primary Examiner* — Kathleen S Holwerda
*Assistant Examiner* — Serenity A Miller
(74) *Attorney, Agent, or Firm* — Christopher A. Rothe; CM Law

(57) ABSTRACT

A surgical instrument, a tool device for a surgical instrument, a method for producing a tool device, and a use of a tool device in a surgical instrument. The surgical instrument includes a shaft, a tool device having a first and a second jaw part and a control assembly, and a handle device. The second jaw part has a receiving recess together with a control projection of the control assembly.

17 Claims, 12 Drawing Sheets

(58) Field of Classification Search
USPC .......................................... 606/205, 207, 208
See application file for complete search history.

(56) References Cited

U.S. PATENT DOCUMENTS

| | | | | |
|---|---|---|---|---|
| 6,733,514 | B2 * | 5/2004 | Miser .................... | A61B 17/29 606/208 |
| 7,799,028 | B2 * | 9/2010 | Schechter ........... | A61B 18/1445 606/41 |
| 8,439,246 | B1 * | 5/2013 | Knodel ................. | A61B 90/92 227/176.1 |
| 8,870,867 | B2 | 10/2014 | Walberg et al. | |
| 9,301,798 | B2 | 4/2016 | Kerr et al. | |
| 9,456,863 | B2 | 10/2016 | Moua | |
| 9,498,242 | B2 | 11/2016 | Crews et al. | |
| 9,603,655 | B2 | 3/2017 | Lutze et al. | |
| 11,564,734 | B2 * | 1/2023 | Crews ................ | A61B 18/1445 |
| 11,602,365 | B2 * | 3/2023 | Heiliger ................. | A61B 34/70 |
| 2007/0078458 | A1 * | 4/2007 | Dumbauld ......... | A61B 18/1442 606/51 |
| 2007/0179499 | A1 * | 8/2007 | Garrison ............ | A61B 18/1445 606/171 |
| 2011/0184404 | A1 * | 7/2011 | Walberg ............. | A61B 18/1445 606/41 |
| 2012/0046682 | A1 | 2/2012 | Nelson et al. | |
| 2012/0065466 | A1 | 3/2012 | Slater | |
| 2014/0236152 | A1 * | 8/2014 | Walberg ............. | A61B 18/1445 606/52 |
| 2016/0270807 | A1 * | 9/2016 | Worrell ................ | A61B 17/282 |
| 2020/0078034 | A1 | 3/2020 | Walberg et al. | |
| 2020/0179038 | A1 | 6/2020 | Heiliger | |
| 2020/0305868 | A1 | 10/2020 | Shelton, IV | |
| 2022/0000534 | A1 | 1/2022 | Xu et al. | |
| 2022/0280227 | A1 * | 9/2022 | Heiliger ................ | A61B 17/29 |
| 2025/0312053 | A1 * | 10/2025 | Rodriguez-Navarro .................... | A61B 17/0218 |

FOREIGN PATENT DOCUMENTS

| | | |
|---|---|---|
| CN | 104042327 A | 9/2014 |
| CN | 105188572 A | 12/2015 |
| CN | 109498149 A | 3/2019 |
| DE | 10136963 A1 | 2/2003 |
| DE | 102017109891 A1 | 11/2018 |
| EP | 2688501 B1 | 8/2015 |
| EP | 3701883 A1 | 9/2020 |
| KR | 20140063727 A | 5/2014 |
| KR | 20140063833 A | 5/2014 |
| WO | 2010135615 A1 | 11/2010 |

OTHER PUBLICATIONS

Office Action received in Japanese Application No. 2023-548341 dated Feb. 7, 2025, with translation, 10 pages.

Notice of Allowance received in Korean Application No. 10-2023-7027503 dated Sep. 17, 2025, with translation, 9 pages.

* cited by examiner

SURGICAL INSTRUMENT, TOOL DEVICE FOR SUCH A SURGICAL INSTRUMENT, AND METHOD FOR PRODUCING SUCH A TOOL DEVICE

CROSS-REFERENCE TO RELATED APPLICATIONS

This application is the United States national phase entry of International Application No. PCT/EP2022/053124, filed on Feb. 9, 2022, and claims priority to German Application No. 10 2021 201 311.2, filed on Feb. 11, 2021. The contents of International Application No. PCT/EP2022/053124 and German Application No. 10 2021 201 311.2 are incorporated by reference herein in their entireties.

FIELD

The invention relates to a surgical instrument having a shaft extending along a shaft longitudinal axis, a tool device arranged distally on the shaft and having a first jaw part and a second jaw part, the first and second jaw parts being pivotable relative to each other, about a pivot axis oriented transversely to the shaft longitudinal axis, to form an openable and closable tool mouth, a grip device arranged proximally on the shaft and having an operating element which is operatively connected to the tool device via a push-pull element, the push-pull element being movable in translation along a longitudinal movement axis by means of an operation of the operating element, the tool device having a control arrangement with a control pin and at least one control groove, the at least one control groove being formed on a control portion of the first jaw part, the control pin extending parallel to the pivot axis and engaging axially through the at least one control groove, and the control pin being slidably movable, by means of a longitudinal movement of the pull-push element, between a proximal end position of the pin and a distal end position of the pin along the control groove and in this way applying to the first jaw part a torque acting about the pivot axis in order to open and/or close the tool mouth.

BACKGROUND

A surgical instrument of this kind is known from US 2020/0179038 A1 and is provided in the form of an endoscopic forceps instrument for sealing and/or cutting through body tissue. The known surgical instrument has an elongate instrument shaft, a grip device with an operating element, and a tool device with an openable and closeable tool mouth. The tool device is arranged at a distal end of the instrument shaft. The grip device is arranged at a proximal end of the instrument shaft. The operating element is operatively connected to the tool device via a push-pull element, which extends longitudinally in the instrument shaft and is movable in translation, for opening and/or closing the tool mouth. For this purpose, the push-pull element engages on a control pin of a control arrangement of the tool device. The control arrangement of the known surgical instrument has a first control groove formed on the first jaw part and a second control groove formed on the second jaw part. The control pin engages through both control grooves and, by means of a longitudinal movement of the push-pull element, is slidably movable along the control grooves between a proximal and a distal end position of the pin. In this way, the longitudinal movement of the push-pull element is converted into a pivoting movement of the two jaw parts, directed about the pivot axis, for opening and/or closing the tool mouth.

SUMMARY

The object of the invention is to make available a surgical instrument of the type mentioned at the outset, a tool device for such an instrument, and a method for such a tool device, each of these affording advantages over the prior art. In particular, the object is to allow a simplified design of the surgical instrument and/or of the tool device and, associated with this, simple production.

As regards the surgical instrument, this object is achieved by the fact that the second jaw part has a receiving recess in which the control portion of the first jaw part is received at least in part, wherein at least one control projection protrudes inward from an inner wall of the receiving recess in the axial direction of the control pin and forms a control surface of the control arrangement, and wherein the control pin, in a movement between the proximal and distal end positions of the pin, slides along the control projection and is supported radially on the latter. The solution according to the invention makes it possible to dispense with a control groove arranged and/or formed on the second jaw part. Such control grooves are usually produced as an oblong hole by means of milling. This is rather complicated. Instead of a conventional control groove, the second jaw part has the at least one control projection, which protrudes inward from an inner wall of the receiving recess in the axial direction of the control pin and forms a control surface of the control arrangement. In this way, a comparatively simple design and simple production of the tool device and, as a result, of the surgical instrument can be achieved. The surgical instrument is preferably provided for grasping, holding, clamping, sealing and/or cutting through body tissue in a minimally invasive operation, in particular in a laparoscopic operation. Accordingly, the tool device is preferably designed in the manner of forceps, clamps and/or scissors, with the first jaw part and the second jaw part forming a mouth of the forceps, clamp and/or scissors. The jaw parts can also be designated as instrument branches or tissue branches. To be able to exert pressure as intended on body tissue located between the first jaw part and the second jaw part, the first jaw part and second jaw part are pivotable relative to each other about the pivot axis. For this purpose, both jaw parts can be pivotable in relation to the pivot axis. Alternatively, the first jaw part can be pivotable and the second jaw part can be fixed, or vice versa. The control arrangement serves to convert the translational movement of the push-pull element, directed along the longitudinal movement axis, into the pivoting movement of the first and/or second jaw part about the pivot axis. The longitudinal movement axis is preferably oriented parallel to the shaft longitudinal axis. The pivot axis is preferably oriented orthogonally to the longitudinal movement axis and/or the shaft longitudinal axis. The control groove of the first jaw part is preferably inclined relative to the longitudinal movement axis. If the first jaw part is pivotable about the pivot axis, a corresponding angle of inclination of the control groove can change depending on a pivoting position of the first jaw part relative to the longitudinal movement axis. The control surface formed by the at least one control projection of the second jaw part can be parallel to and/or at least in part inclined with respect to the longitudinal movement axis. The second jaw part preferably has control projections arranged on both sides of the receiving recess in the axial direction of the control pin. The second jaw part can be designed in one piece or in several pieces. In the latter case, the second jaw part preferably has an active portion, which is provided to act on the body tissue, and a housing portion which carries the receiving recess together with the at least one control projection, wherein the active portion and the housing portion are each manufactured separately and are then connected to each other, preferably in a form-fitting manner.

In one embodiment of the invention, the second jaw part has securing surfaces which delimit the receiving recess in the axial direction of the control pin and between which the control pin, in a movement between the proximal and distal end positions of the pin, is positively secured against axial displacement. In this way, it is possible to dispense with a separate force-fitting and/or cohesively bonded connection of the control pin to the push-pull element for the axial securing. This permits an even more simplified design and further simplified production. The securing surfaces are formed on the inner wall of the receiving recess. In this embodiment of the invention, the receiving recess is closed on both sides in the axial direction of the control pin. In the movement between the proximal and distal end positions of the pin, the control pin moves within the receiving recess, along the control projection and, in relation to its axial direction, between the opposing securing surfaces.

In a further embodiment of the invention, the second jaw part has a pivot bearing surface which, forming the pivot axis, interacts in a sliding movement with a complementary pivot bearing surface of the first jaw part. In this way, it is possible to dispense with a separate component for forming a pin or bolt connection, pivotable about the pivot axis, between the first jaw part and the second jaw part. The reduced number of components permits a simplified design and, associated with this, advantageous production of the tool device and/or of the surgical instrument. The pivot bearing surface of the second jaw part and the complementary pivot bearing surface of the first jaw part interact positively in a sliding movement about the pivot axis and radially with respect to the pivot axis at least on one side, preferably radially inwardly. The pivot bearing surface of the second jaw part is preferably convex, and the complementary pivot bearing surface of the first jaw part is preferably concave to match, or vice versa.

In a further embodiment of the invention, the pivot bearing surface of the second jaw part is formed by an outer circumference of a transverse web portion which engages over the receiving recess in the axial direction of the control pin. The transverse web portion creates a cohesively bonded and/or integral connection between inner walls of the receiving recess that lie opposite in the axial direction of the control pin. The transverse web portion can also be designated as a bridge. The transverse web portion extends parallel to the pivot axis. The pivot bearing surface of the second jaw part is preferably formed by an underside of the transverse web portion or alternatively by the upper side of the latter.

In a further embodiment of the invention, the second jaw part has a pivot guiding surface which is curved and concentric to the pivot axis and which interacts in a sliding movement with a complementary pivot guiding surface of the first jaw part. The pivot guiding surface of the first jaw part and the complementary pivot guiding surface of the second jaw part interact in a form-fitting manner so as to be slidable about the pivot axis and radially thereto. The pivot guiding surface and the complementary pivot guiding surface serve for improved guidance of the pivoting mobility of the tool mouth about the pivot axis. If the pivot axis is arranged in an upper region of the second jaw part in relation to a vertical direction, the pivot guiding surface is preferably arranged in a lower region of the second jaw part, or vice versa. On account of the pivoting guide formed between the pivot guiding surface and the complementary pivot guiding surface, it is possible to dispense with separate relevant components, and a further simplified design can be achieved. In other words, the pivoting guide is formed directly between the first jaw part and the second jaw part.

In a further embodiment of the invention, the second jaw part has a longitudinal guide surface which extends parallel to the longitudinal movement axis of the push-pull element and on which a complementary longitudinal guide surface of the push-pull element is at least temporarily guided slidably during the longitudinal movement of the latter. The longitudinal guide between the second jaw part and the push-pull element counteracts an unwanted movement of the push-pull element directed transversely with respect to the longitudinal movement axis. At the same time, an unwanted movement of the control pin acting on the push-pull element can thereby be avoided. This assists an intended movement of the control pin along the at least one control projection. In particular, unwanted lifting of the control pin from the control surface formed by the control projection can be counteracted. The longitudinal guide surface is preferably arranged in a proximal region of the second jaw part. The complementary longitudinal guide surface is preferably formed by an upper or lower side of the push-pull element. The slidable guiding between the second jaw part and the push-pull element is preferably effected only temporarily, for example when the control pin moves in the region of its proximal end position.

In a further embodiment of the invention, a stop portion arranged and/or formed on the second jaw part is provided which, in an open position of the tool mouth, interacts positively with a complementary stop portion of the first jaw part about the pivot axis. This counteracts an opening of the tool mouth that goes beyond the open position. The complementary stop portion of the first jaw part is preferably arranged proximally on the control portion thereof. The stop portion assigned to the second jaw part is preferably arranged and/or formed in the region of the receiving recess. The stop portion is particularly preferably a wall portion of a connecting sleeve which can be pushed onto a proximal end of the second jaw part.

In a further embodiment of the invention, the second jaw part is fixed in relation to the pivot axis, and the first jaw part, during the opening and closing of the tool mouth, rotates about the pivot axis relative to the second jaw part. In this context, this can also be referred to as unilateral pivoting mobility of the tool mouth. This is in contrast to bilateral pivoting mobility, in which both jaw parts rotate about the pivot axis in order to open and close the tool mouth. The embodiment with unilateral pivoting mobility permits a further simplified design of the tool device.

In a further embodiment of the invention, the second jaw part has a one-piece housing portion and an active portion mounted distally on the housing portion, the housing portion having at least the receiving recess together with the at least one control projection and/or the pivot bearing surface. The active portion is preferably mounted in a form-fitting manner on the housing portion. The active portion can be secured to the housing portion rigidly or so as to be tiltable about a tilt axis that preferably extends parallel to the pivot axis. If provided as such, the pivot bearing surface, the pivot guiding surface, the longitudinal guide surface and/or the stop portion are preferably also formed on the housing portion.

An integral design of this kind affords many advantages in terms of production and assembly.

In a further embodiment of the invention, the control groove between a proximal groove end and a distal groove end extends continuously straight. Compared to an angled longitudinal extent of the control groove that is straight only in part, further simplified manufacture can be achieved as a result.

In a further embodiment of the invention, the control surface has a proximal surface portion and a distal surface portion which are inclined differently relative to the longitudinal movement axis in such a way that, in the movement of the control pin between the proximal and the distal end positions of the pin, different transmission ratios between the longitudinal movement of the push-pull element and the pivoting movement of the tool mouth are achieved. Correspondingly different transmission ratios necessarily result for the longitudinal force associated with the longitudinal movement and for the clamping force associated with the pivoting movement of the tool mouth, which clamping force can be exerted on body tissue located between the jaw parts. On account of the differently inclined surface portions of the control surface, it is possible, starting from the open position of the tool mouth, to obtain at first a comparatively rapid closing and thereafter a comparatively slow closing of the tool mouth. In this way, an initial opening of the tool mouth can be achieved with a comparatively small longitudinal movement of the push-pull element and thus with a small manual operating path of the operating element. In other words, a stroke required on the operating element can be reduced, which is particularly advantageous for smaller hands. At the same time, a comparatively high clamping force can be generated on the tool mouth using a comparatively low manual operating force on the operating element. A variable transmission in the sense of this embodiment can also be achieved by means of a non-linear oblong hole, i.e. an oblong hole that is differently inclined over its length.

In a further embodiment of the invention, the proximal surface portion extends parallel and/or at least substantially parallel to the longitudinal movement axis. If the control pin moves along the proximal surface portion, this results in a comparatively small transmission ratio in this embodiment of the invention. Accordingly, a comparatively low manual operating force on the operating element causes a comparatively high clamping force at the tool mouth. In its proximal end position, the control pin is preferably positioned in the region of the proximal surface portion.

In a further embodiment of the invention, the distal surface portion is curved and concentric with respect to the pivot axis. Depending on the direction of movement of the control pin, different advantages are achieved as a result. In a movement in the direction of the proximal end position of the pin, the control pin has an always constant lever arm in relation to the pivot axis as it moves along the distal surface portion. This ensures a constant transmission ratio in the region of the distal surface portion. This can afford advantages in terms of ease of application and user-friendliness. During a movement in the direction of the distal end position of the pin, the curved and concentric longitudinal extent of the distal surface portion preferably ensures a constant radial play between the control pin and the distal surface portion over the pivoting movement. In the case of a reversal of movement initiated by the operator, this affords additional advantages, since the operator can always count on a constant play and thus a constant idle stroke on the operating element. This further improves the ease of application and user-friendliness.

In a further embodiment of the invention, the distal surface portion is straight and tangential to a circular arc arranged concentrically with respect to the pivot axis. Compared to the previous embodiment of the invention, similar ease of application and user-friendliness can be achieved with at the same time simplified production of the distal surface portion.

In a further embodiment of the invention, the control pin, in a movement in the direction of the distal end position of the pin, is held at least temporarily at the distal groove end of the control groove and rotates together with the first jaw part about the pivot axis. In this way, it is possible in particular to counteract excessive radial play between the control pin and the control surface of the control projection, in particular the distal surface portion of the control surface.

The invention moreover relates to a tool device for a surgical instrument as per the above description, having a first jaw part and a second jaw part, the first and second jaw parts being pivotable relative to each other, about a pivot axis, to form an openable and closable tool mouth, the tool device having a control arrangement with a control pin and at least one control groove, the at least one control groove being formed on a control portion of the first jaw part, the control pin extending parallel to the pivot axis and engaging axially through the at least one control groove, and the control pin being slidably movable between a proximal end position of the pin and a distal end position of the pin along the control groove and in this way applying to the first jaw part a torque acting about the pivot axis in order to open and/or close the tool mouth.

As regards the tool device, the object mentioned at the outset is achieved by the fact that the second jaw part has a receiving recess in which the control portion of the first jaw part is received at least in part, wherein at least one control projection protrudes inward from an inner wall of the receiving recess in the axial direction of the control pin and forms a control surface of the control arrangement, and wherein the control pin, in a movement between the proximal and distal end positions of the pin, slides along the control projection and is supported radially on the latter. As regards advantages associated with the tool device according to the invention, in order to avoid repetition, reference is expressly made to the above description. What has been stated concerning the tool device of the surgical instrument according to the invention applies analogously with regard to the tool device according to the invention. Advantageous embodiments of the tool device according to the invention will be clearly apparent from the features of the tool device of the embodiments of the surgical instrument according to the invention.

The invention moreover relates to a method for producing a tool device as per the above description. The method according to the invention comprises the step of primary forming of the second jaw part, wherein at least one housing portion of the second jaw part carrying the at least one control projection is provided by primary forming. The primary forming preferably takes place by means of powder injection molding (metal injection molding). By virtue of the design of the second jaw part according to the invention, a comparatively simply designed primary forming tool can be used. In particular, it is possible to dispense with slides, stamps or the like on the primary forming tool.

In a further embodiment of the invention, the method comprises the step of positively joining together the first jaw part and the primary-formed housing portion, wherein a pivot bearing surface of the second jaw part, formed on the housing portion, and a complementary pivot bearing surface of the first jaw part, while forming the pivot axis, are slidably movable about the latter and are secured to each other in a form-fitting manner radially with respect to the pivot axis. Accordingly, for forming the pivoting mobility of the tool mouth, the first jaw part and the second jaw part are not connected to each other for example with a separate pin, axle or bolt element. Rather, the first jaw part and the second jaw part are joined together in a form-fitting manner so as to be slidable directly about the pivot axis and radially with respect to the latter. The joining connection is formed between the pivot bearing surface of the second jaw part and the complementary pivot bearing surface of the first jaw part.

BRIEF DESCRIPTION OF THE DRAWINGS

Further advantages and features of the invention will become clear from the claims and from the following description of preferred exemplary embodiments of the invention, which are shown in the drawings.

DETAILED DESCRIPTION

Figure 1:
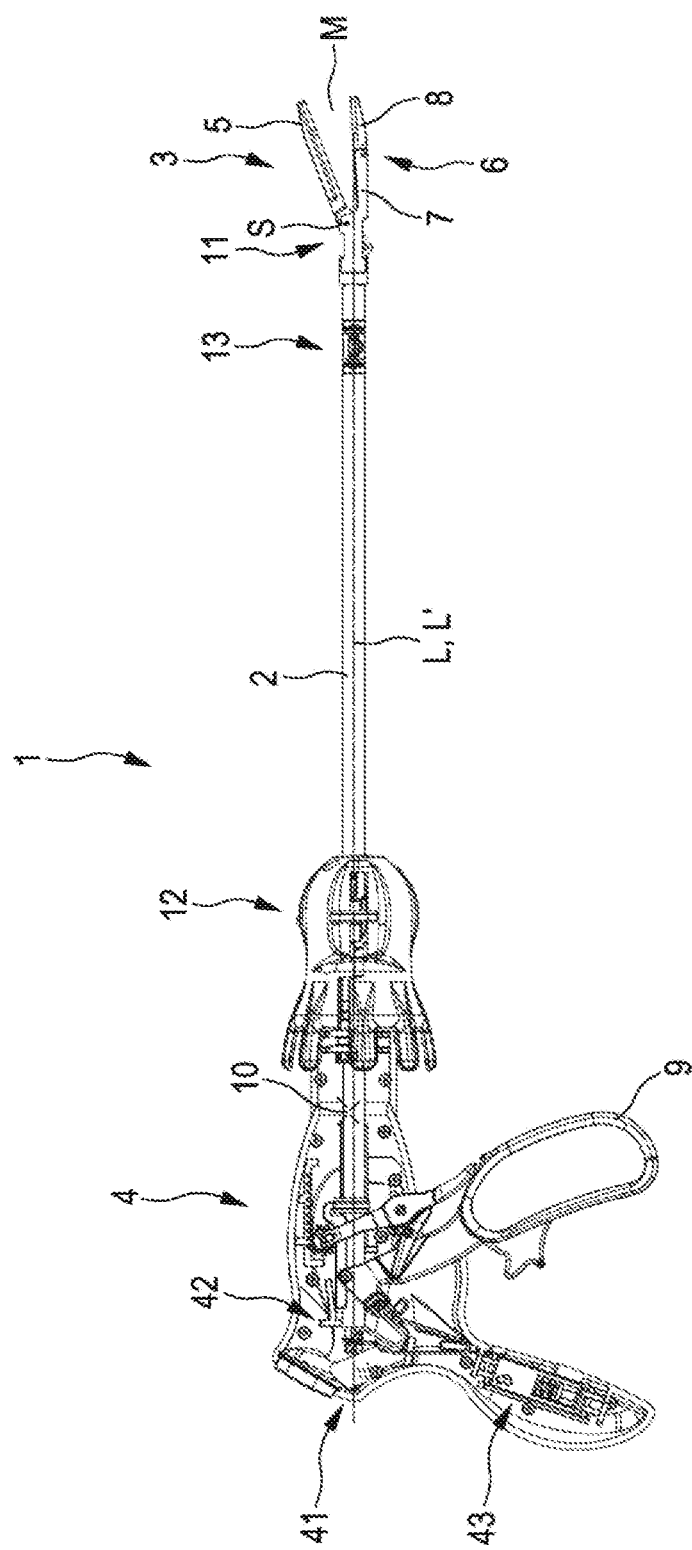
FIG. 1 shows a schematic side view of an embodiment of a surgical instrument according to the invention with a grip device, an elongate shaft and an embodiment of a tool device according to the invention.

According to FIG. 1, a surgical instrument 1 has a shaft 2 extending longitudinally along a shaft longitudinal axis L, a tool device 3 arranged distally on the shaft 2, and a grip device 4 arranged proximally on the shaft 2.

The tool device 3 has a first jaw part 5 and a second jaw part 6. The two jaw parts 5, 6 are pivotable relative to each other about a pivot axis S (FIG. 2), oriented transversely with respect to the shaft longitudinal axis L, to form an openable and closable tool mouth M.

In the embodiment shown, the second jaw part 6 is designed in several pieces and has a proximal housing portion 7 and a distal active portion 8 which is positively fixed to a distal end of the housing portion 7 in a manner that will be described in more detail below. Such a multi-piece design of the second jaw part 6 is advantageous, but it is not to be regarded as essential in terms of the teaching according to the invention. Accordingly, in an embodiment not shown, the second jaw part has a one-piece design.

The grip device 4 has a manually movable operating element 9 which is operatively connected to the tool device 3 via a push-pull element 10. As a result, the tool mouth M can be opened and/or closed by operation of the operating element 9 in order to grasp and clamp body tissue that is located between the jaw parts 5, 6.

The design of the grip device 4 shown in FIG. 1 is to be considered purely as an example. In the present case, the grip device 4 has a housing which is formed from a plurality of housing parts (not designated in any more detail) and on and/or in which further components of the grip device are mounted, in particular the operating element 9. FIG. 1 shows only one housing half (not designated in any more detail) of said housing. For the movable mounting of the operating element 9 on the housing, the grip device 4 has an operating mechanism 41, the design of which is known in principle and is described, for example, in the German patent application DE 10 2017 109 891 A1. In addition, a coupling mechanism 42 is provided, which is likewise described in said patent application and serves to couple the operating element 9 to the push-pull element 10 in a manner that transmits force and movement. The operating element 9 can be moved manually in a reciprocating motion relative to the housing of the grip device 4 between a distal end position (FIG. 1) and a proximal end position, which is not shown in more detail in the drawing. In the proximal end position, the operating element 9 can be locked, in a manner known per se, by means of a locking mechanism 43, which is also referred to as a rotation lock. In order to assist a movement in the direction of the distal end position of the operating element 9, the operating mechanism 41 can have a spring element, which is not designated in any more detail.

The push-pull element 10 is movable in translation along a longitudinal movement axis L' by means of said reciprocating motion of the operating element 9. In the embodiment shown, the longitudinal movement axis L' of the push-pull element 10 coincides with the shaft longitudinal axis L. At its distal end, the push-pull element 10 is operatively connected to a control arrangement 11 of the tool device 3 in a manner described in more detail below. The control arrangement 11 is configured to convert the translational movement of the push-pull element 10 into a pivoting movement of the first jaw part 5 and/or of the second jaw part 6 directed about the pivot axis S.

In the embodiment shown, the second jaw part 6 is fixed in relation to the pivot axis S, and the first jaw part 5 is pivotable in relation to the pivot axis S. In this sense, only the first jaw part 5 is pivoted in order to open and close the tool mouth M. In this context, it can also be said to be a unilateral pivoting mobility. This is in contrast to a bilateral pivoting mobility, in which both jaw parts are pivotable relative to the pivot axis S. In an embodiment not shown in the drawing, such bilateral pivoting mobility can be provided.

In the embodiment shown in FIG. 1, the entire tool device 3 is fixed to the shaft 2 in such a way as to be bendable relative to the shaft longitudinal axis L. A bending mechanism 12, 13 with an operating unit 12 on the grip side and with a swivel unit 13 on the shaft side is provided for bending the tool device 3. The structure and functioning of the bending mechanism 12, 13 are known in principle and are described, for example, in the European patent EP 2 688 501 B1. Alternatively, the tool device 3 can be fixed to the shaft 2 rigidly and/or so as only to be rotatable about the shaft longitudinal axis L.

Figure 2:
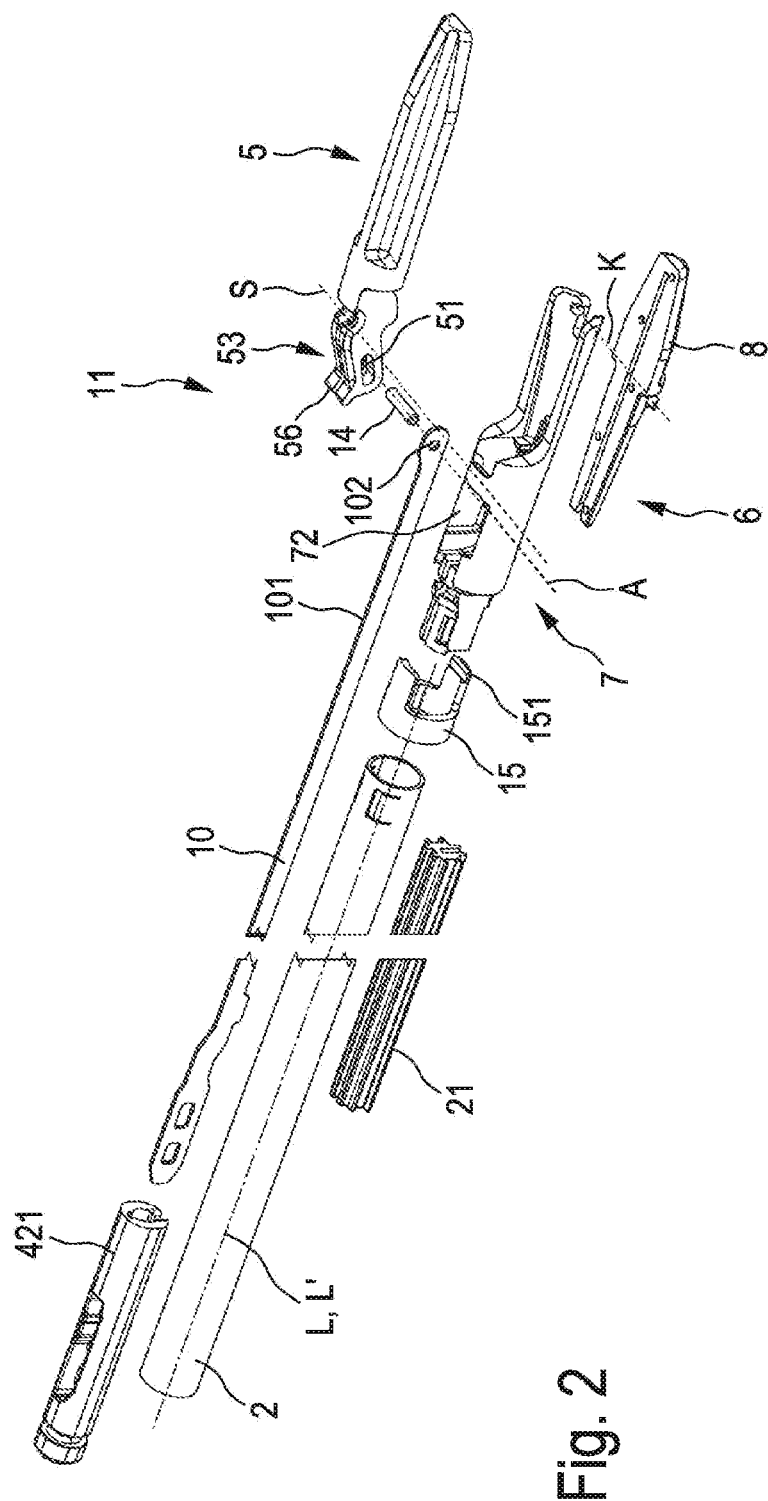
FIG. 2 shows a perspective exploded view of the tool device and further components of the surgical instrument, the tool device having a first jaw part and a multi-piece second jaw part.

In the present embodiment, the push-pull element 10 is band-shaped and extends longitudinally within the shaft 2 (FIG. 2). A guide element 21 is arranged in the shaft in the present case, in particular for improved longitudinal guiding of the push-pull element 10 within the shaft 2.

At its proximal end, the push-pull element 10 interacts with a component 421 of the coupling mechanism 42. At its distal end, the push-pull element 10 interacts with a control pin 14 of the control arrangement 11.

The control arrangement 11 has at least one control groove 51 (FIG. 6) and at least one control projection 71. The at least one control groove 51 is assigned to the first jaw part 5. The at least one control projection 71 is assigned to the second jaw part 6 and in the present case is formed on the housing portion 7 of the latter. In a translational movement of the push-pull element 10, the control pin 14 interacts with the control groove 51 and the control projection 71 in a sliding manner. Before discussing the further functioning of the control arrangement 11 when opening and closing the tool mouth 12, further features of the first and second jaw parts 5, 6 are described with reference to FIGS. 3 to 7.

Figure 3:
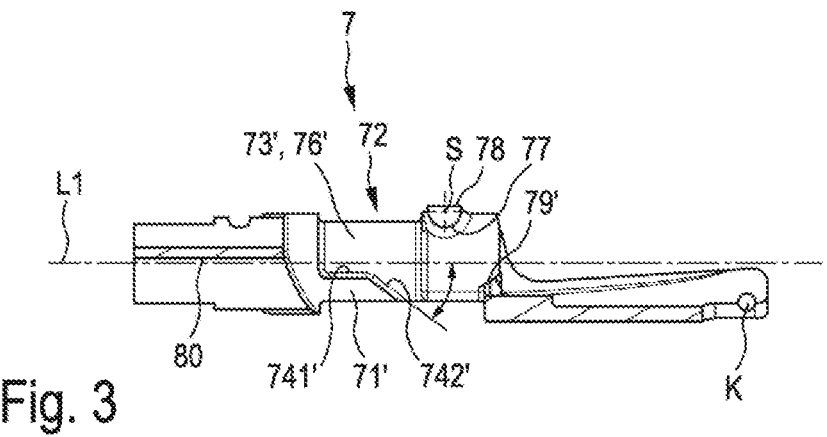
FIG. 3 shows a housing portion, assigned to the second jaw part, along a section III-III according to FIG. 4.
Figure 4:
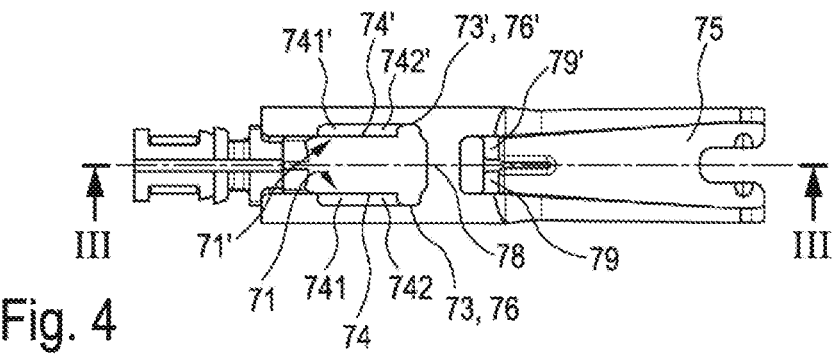
FIG. 4 shows the housing portion according to FIG. 3 in a plan view.

As is shown in particular in FIGS. 3 and 4, the second jaw part 6 has a receiving recess 72, in the present case on its housing portion 7. The at least one control projection 71 protrudes inward from an inner wall 73 of the receiving recess 72 in the axial direction A (FIG. 2) of the control pin 14. The at least one control projection 71 forms a control surface 74 of the control arrangement 11, which interacts with the control pin 14 in a manner described in more detail below. In the embodiment shown, the control surface 74 extends in parts with different angles of inclination in relation to the shaft longitudinal axis L and/or the longitudinal movement axis L', in a manner described in more detail below. In an embodiment not shown in the drawing, the control surface can instead extend continuously parallel or inclined with respect to said longitudinal axes.

The second jaw part 6, in particular its housing portion 7, has a mirror-symmetrical design in the present case (FIG. 4). Accordingly, a further control projection 71' is provided, which protrudes inward from an inner wall 73' of the recess 72 in the axial direction A of the control pin 14. The further control projection 71' forms a further control surface 74'. During its movement, the control pin 14 interacts in a sliding manner with both control projections 71, 71' and with the control surfaces 74, 74' formed on these. To avoid repetition, reference is made in the first instance to the details of the control projection 71 and its control surface 74. What has been disclosed in that connection also applies, mutatis mutandis, to the further control projection 71' and the control surface 74' of the latter. The same applies the other way round.

The housing portion 7 extends along its longitudinal axis L1 between a proximal end and a distal end. In the embodiment shown, the receiving recess 72 is arranged approximately centrally between the proximal and distal ends of the housing portion 7 and is open in the distal direction in relation to the longitudinal axis L1 and at the top in relation to the drawing plane of FIG. 3. In the state ready for operation, the proximal end of the housing portion 7 is fixed in a form-fitting manner on the distal end of the shaft 2 (FIG. 2). The active portion 8 is arranged at the proximal end of the housing portion 7 and is mounted on a receiving portion 75 of the housing portion 7 in a form-fitting manner so that it is able to tilt about a tilt axis K (FIG. 2) and along the longitudinal axis L1. The active portion 8 is provided to act on the body tissue and is rigidly mounted on the housing portion 7 in an embodiment not shown in the drawing. In a further embodiment, the active portion 8 can be formed in one piece with the housing portion 7.

In the assembled state ready for operation, the control pin 14 is arranged inside the receiving recess 72. The control pin 14 is held in a form-fitting manner in the axial direction A between the inner walls 73, 73'. The inner walls 73, 73' here form securing surfaces 76, 76' for axially securing the control pin 14. The two inner walls 73, 73' and thus the two securing surfaces 76, 76' are spaced apart from one another in the axial direction A by a distance that is slightly greater than an axial length of the control pin 14.

Figure 6:
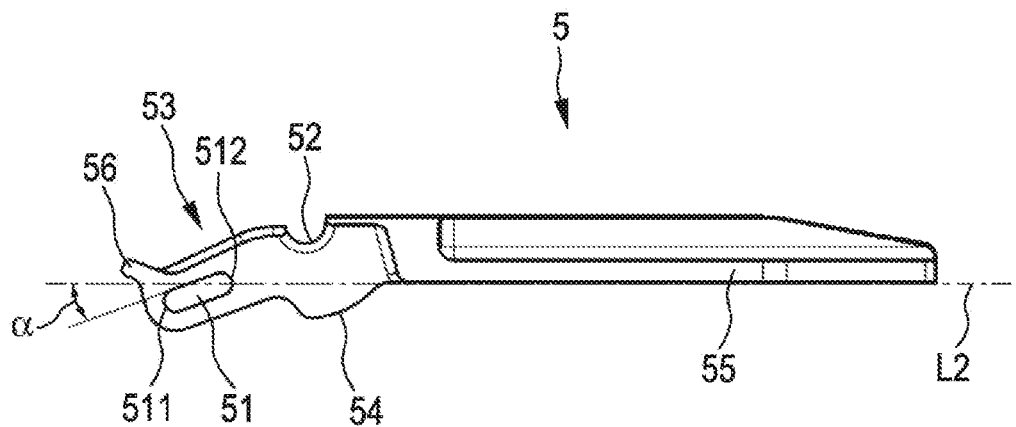
FIG. 6 shows the first jaw part in a schematic side view.

In the present case, the second jaw part 6, more precisely its housing portion 7, has a pivot bearing surface 77 which, forming the pivot axis S, interacts with a complementary pivot bearing surface 52 of the first jaw part 5 (FIG. 6). In the present case, the pivot bearing surface 77 is formed by an outer circumference of a transverse web portion 78 which engages over the receiving recess 72 in the axial direction A of the control pin 14. The transverse web portion 78 can also be referred to as a bridge. The pivot bearing surface 77 is formed by an underside of the transverse web portion 78, in relation to the plane of the drawing in FIG. 3. The pivot axis S is arranged above the control surface 74. In the assembled state ready for operation, a control portion 53 of the first jaw part (FIG. 6) carrying the control groove 51 engages under the transverse web portion 78, wherein the complementary pivot bearing surface 52 is pivotably movable about the pivot axis S and supported in a form-fitting manner on the pivot bearing surface 77 in the radial direction inward.

Furthermore, the second jaw part 6, more precisely its housing portion 7, has a pivot guiding surface 79 in the present case. The pivot guiding surface 79 is in the present case located at a distal end of the housing recess 72. In this case, the pivot guiding surface 79 is curved and extends concentrically with respect to the pivot axis S. In the assembled state ready for operation, the pivot guiding surface 79 interacts slidably about the pivot axis S and radially to the pivot axis S outward in a form-fitting manner with a complementary pivot guiding surface 54 of the first jaw part (FIG. 6). A further pivot guiding surface 79' is provided here. The two pivot guiding surfaces 79, 79' of the housing portion 7 are arranged and/or designed mirror-symmetrically with respect to its longitudinal axis L1. The further pivot guiding surface 79' interacts in a corresponding manner with a further, complementary pivot guiding surface of the first jaw part 5, which cannot be seen in any detail. In an embodiment not shown in the drawing, only one pivot guiding surface and one complementary pivot guiding surface are provided.

In the present case, the second jaw part 6 has a longitudinal guide surface 80 on its housing portion 7. The longitudinal guide surface 80 extends parallel to the longitudinal movement axis L' of the push-pull element 10 and serves to support the push-pull element 10 vertically at one side. For this purpose, the longitudinal guide surface 80 interacts at one end in a form-fitting manner with a complementary longitudinal guide surface 101 of the push-pull element 10 in a sliding movement along the longitudinal movement axis L' and in a vertical direction perpendicular to the longitudinal movement axis L'. In the present case, the complementary longitudinal guide surface 101 is formed by an upper flat side of the push-pull element. In the present case, the slidable support of the push-pull element 10 is effected only temporarily and depending on a respective state of displacement of the control pin 14 along the control surface 74. This will be discussed in more detail below. The longitudinal guide surface 80 is arranged at the proximal end of the housing portion 7.

In the embodiment shown, the control surface 74 has a proximal surface portion 741 and a distal surface portion 742. The two surface portions 741, 742 extend at different inclinations relative to the longitudinal axis L1 and thus also to the shaft longitudinal axis L and/or longitudinal movement axis L' aligned parallel thereto. The proximal surface portion 741 extends parallel to the longitudinal movement axis L'. The distal surface portion 742, on the other hand, extends at an inclination. The inclination of the distal surface portion 742 is in the distal direction from the top downward (FIG. 3). The distal surface portion 742 is straight and is oriented tangentially to a circular arc arranged concentrically with respect to the pivot axis S.

Figure 5:
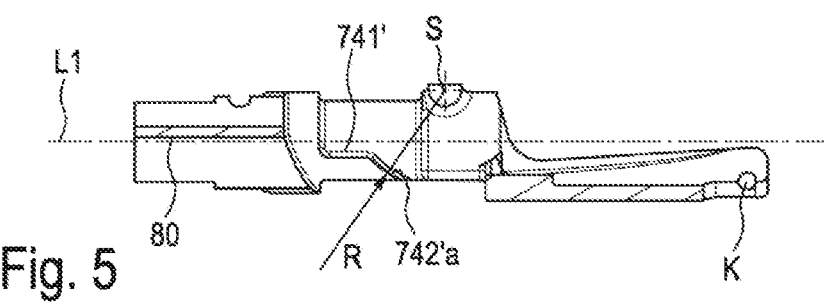
FIG. 5 shows a variant of the housing portion according to FIGS. 3 and 4.

A variant with a differently configured distal surface portion 742a is shown in FIG. 5, the latter depicting only the symmetrically opposite surface portions 741' and 742'a. In contrast to the distal surface portion 742 of the variant according to FIGS. 3 and 4, the distal surface portion 742a is curved and extends concentrically with respect to the pivot axis S. Apart from the design of the distal surface portion 742a, the variant shown in FIG. 5 is identical to the embodiment shown in FIGS. 3 and 4. In the present case, the distal surface portion 742a is spaced from the pivot axis S by a radius R.

Compared to the curved distal surface portion 742a, the straight distal surface portion 742 is comparatively easy to manufacture. By contrast, the curved design of the distal surface portion 742a offers advantages that will be explained in more detail, in particular with regard to guiding the control pin 14 with as little play as possible.

The first jaw part 5 extends along a longitudinal axis L2 between a distal end and a proximal end. The control portion 53 carrying the control groove 51 is arranged proximally. Like the second jaw part 6, the first jaw part 5 has a distally arranged active portion 55. In contrast to the active portion 8 of the second jaw part 6, the active portion 55 is integral with the other portions of the first jaw part 5. In other words, the first jaw part 5 is in one piece overall, although this is not absolutely necessary. An electrode, for example, and insulation components for sealing body tissue can also be arranged on the first jaw part 5. In the embodiment shown, the control portion 53 also has the complementary pivot bearing surface 52 and the complementary pivot guiding surface 54 in addition to the control groove 51. The complementary pivot bearing surface 52 is arranged on an upper side (with respect to the drawing plane of FIG. 6) of the control portion 53. The complementary pivot guiding surface 54 is arranged on an underside 54. The control groove 51 extends between a proximal groove end 511 and a distal groove end 512. In the present case, the control groove 51 between the groove ends 511, 512 is continuously straight and not, for example, angled or curved. The latter can be provided in embodiments that are not shown in the drawings. The control groove 51 extends at an inclination in relation to the longitudinal axis L2 of the first jaw part 5. The longitudinal inclination here runs from the bottom upward in the distal direction. In any case, in a closed position of the tool mouth M (FIG. 11), the longitudinal axis L2 of the first jaw part 5 is oriented parallel to the longitudinal axis L1 of the second jaw part 6 and thus also parallel to the shaft longitudinal axis L and/or the longitudinal movement axis L'. In the closed position, the control groove 51 is inclined at an angle α (FIG. 6) with respect to said longitudinal axes L, L', L1, L2. In relation to the longitudinal axis L2, the angle of inclination a is of course unchangeable, also depending on the pivoting position of the first jaw part 5 about the pivot axis S. By contrast, the angle of inclination a changes in relation to the longitudinal axes L, L' and L1 depending on the pivoting position.

Figure 17:
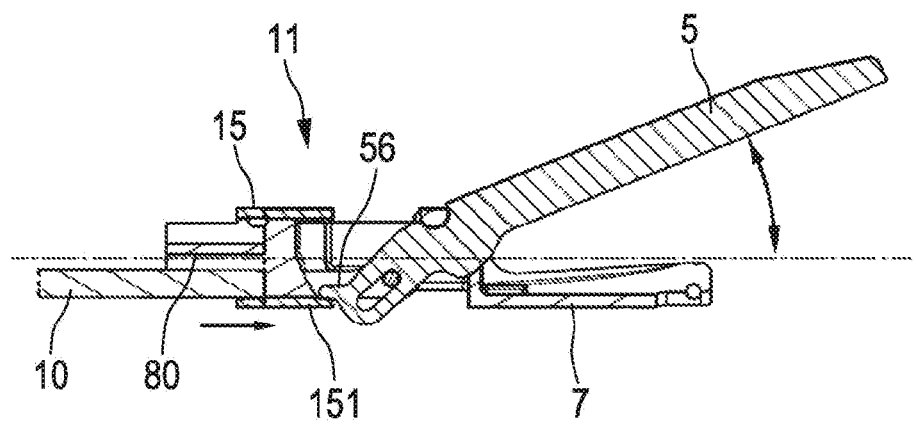
FIGS. 17 and 18 show further schematic views illustrating a further method step.
Figure 18:
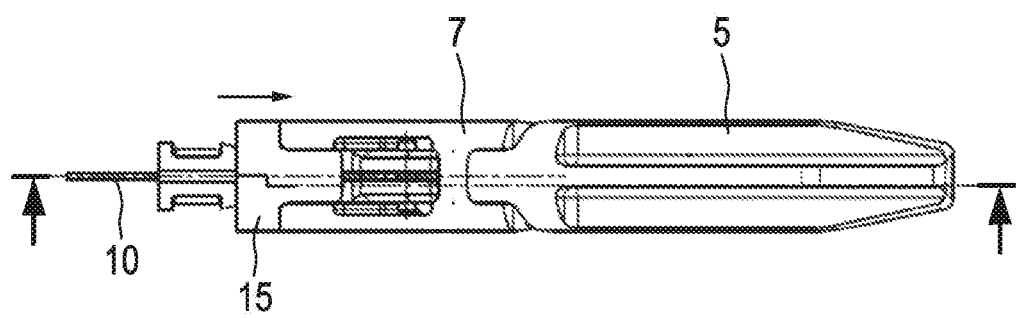

In the present case, the first jaw part 5 also has a stop portion 56 which, in order to limit the open position, interacts with a complementary stop portion 151 assigned to the second jaw part 6 (FIG. 17). The complementary stop portion 151 is arranged on the sleeve 15 in the embodiment shown. In an embodiment that is not shown in the drawing, the complementary stop portion can instead be formed directly on the housing portion. In the embodiment shown, the stop portion 56 protrudes in the proximal direction in the form of a pin from the control portion 53.

Figure 7:
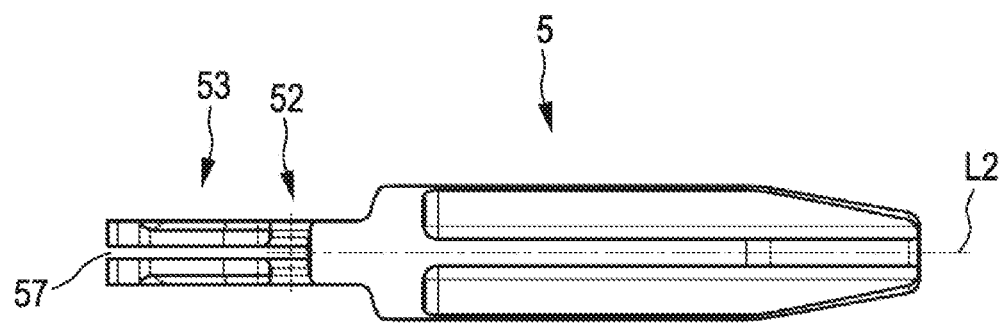
FIG. 7 shows the first jaw part according to FIG. 6 in a schematic plan view.
Figure 8:
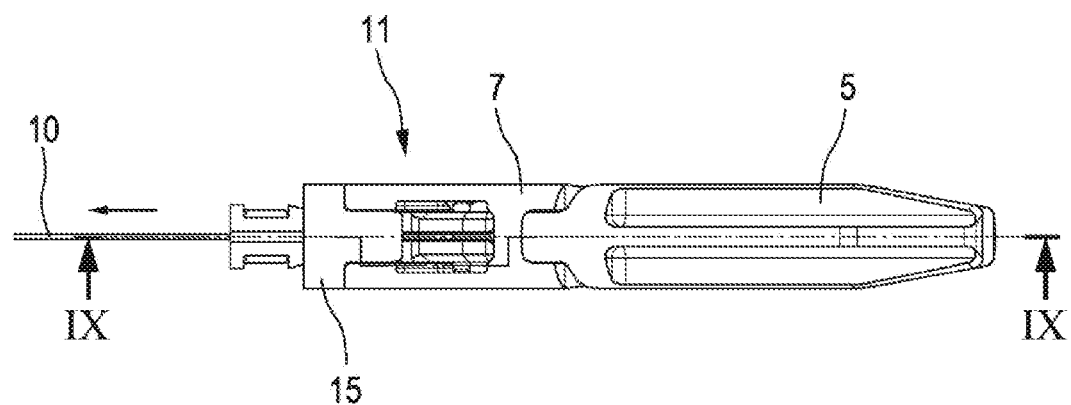
FIG. 8 shows the tool device in a schematic plan view, with inclusion of a stepped section IX-IX relevant to FIGS. 9 to 13.

As shown in FIG. 7, the first jaw part 5 in the embodiment shown has a mirror-symmetrical design with respect to its longitudinal axis L2. The control portion 53 has a receiving slot 57 which extends parallel to the longitudinal axis L2 and which is provided for receiving the distal end of the push-pull element 10. The receiving slot 57 subdivides the control portion 53 and the functional surfaces and/or functional portions arranged thereon into sub-surfaces and/or sub-portions that are arranged and designed mirror-symmetrically. In this sense, one can refer, for example, to the control groove 51 and to a further control groove separated by the receiving slot 57. For the sake of simplicity, however, only the control groove 51 is referred to below.

In the assembled state ready for operation, the control pin 14, which is radially fixed in a bore 102 (FIG. 2) on the push-pull element 10, protrudes through the control groove 51 in the axial direction A. At its ends protruding axially from the control groove 51, the control pin 14 interacts in the radial direction with the control surfaces 74, 74' (FIG. 4). For the sake of brevity in the context of the following functional description with reference to FIGS. 8 to 13, only the control surface 74 or control projection 71 is discussed.

Figure 9:
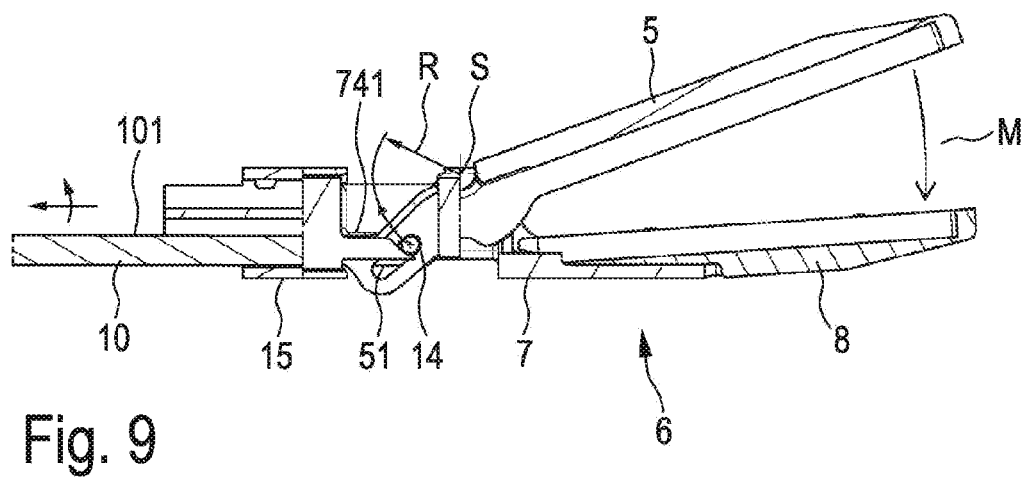
FIG. 9 shows a sectional view of the tool device, wherein a tool mouth formed by the first jaw part and second jaw part adopts an open position.

FIG. 9 shows the open position of the tool mouth M. In this position, the first jaw part 5 is pivoted by an angle (not specified) about the pivot axis S relative to the second jaw part 6, such that body tissue can be grasped between the two jaw parts 5, 6, more precisely between the active portions 8, 55. In the open position of the tool mouth M, the control pin 14 is in a distal pin end position. The operating element 9 is in the position shown in FIG. 1. The push-pull element 10 is moved along the longitudinal movement axis L' to a distal end position.

In order to move the tool mouth M in the direction of the closed position (FIG. 11), the operating element 9 is moved manually in the proximal direction in a pivoting and/or stroke movement. The operating mechanism 41 and the coupling mechanism 12 convert the proximal stroke movement of the operating element 9 into a proximal longitudinal movement of the push-pull element 10 in a manner that is basically known. In this way, the control pin 14 is shifted relative to the control groove 51 and the control surface 74, starting from the distal end position of the pin (FIG. 9). In the distal end position, the control pin 14 in the present case is arranged in the region of a distal end of the distal surface portion 742a and at the same time in the region of the distal groove end 512. From there, the control pin 14 moves in the proximal direction along the distal surface portion 742a, subjecting the first jaw part 5 to a torque directed about the pivot axis S. On account of the existing longitudinal inclination of the distal surface portion 742a, the control pin 14 is displaced proximally and at the same time vertically upward, in relation to the plane of the drawing in FIGS. 9 to 13. In addition to its translational movement, the push-pull element 10 here performs a slight rotation about a pivot axis (not designated in any detail and oriented parallel to the pivot axis S) in the region of the coupling mechanism 42. On account of the distal surface portion 742a being curved concentrically with the radius R about the pivot axis S, the control pin 14 is guided here on a circular path with the radius R about the pivot axis S.

In the case of the straight angled guide path according to FIGS. 3 and 4, the control pin 14 does not follow said circular path and instead is guided linearly along the distal surface portion 742.

Figure 10:
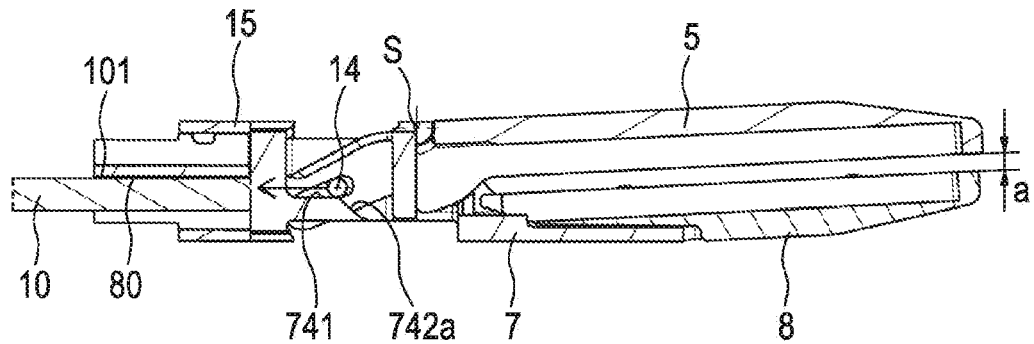
FIG. 10 shows a further sectional view of the tool device, wherein the tool mouth, starting from the open position, is moved in the direction of a closed position.

In the functional position shown in FIG. 10, the control pin 14 is shifted beyond the distal surface portion 742a into the proximal surface portion 741. The tool mouth M is not yet completely closed and is instead open by an opening width a. In this functional position, preferably no clamping force, or at least no significant clamping force, is exerted on body tissue located between the jaw parts 5, 6. Rather, the clamping force is built up starting from the functional position shown in FIG. 10. For complete closing of the tool mouth M and an associated build-up of clamping force, the control pin 14 is moved further in the proximal direction, starting from the position shown in FIG. 10. Here, the control pin 14 slides along the proximal surface portion 741 oriented parallel to the longitudinal movement axis L'. At the same time, further vertical movement of the push-pull element 10 is prevented by the longitudinal guide surface 80.

Figure 11:
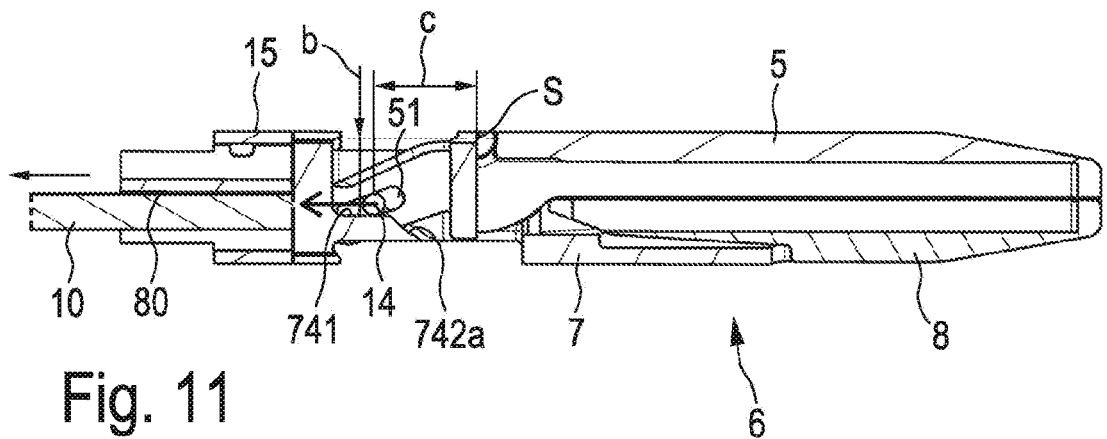
FIG. 11 shows a further sectional view of the tool device, wherein the tool mouth adopts the closed position.

The closed position of the tool mouth M is shown in FIG. 11. In this position, an additional build-up of clamping force can be achieved by a further proximal movement of the control pin 14. The parallel orientation of the proximal surface portion 741 and its positioning in relation to the pivot axis S result in particularly advantageous lever ratios for force and/or torque transmission to the first jaw part 5. The prevailing lever ratios can be described by the lever arms b, c in the functional position shown in FIG. 11.

Figure 12:
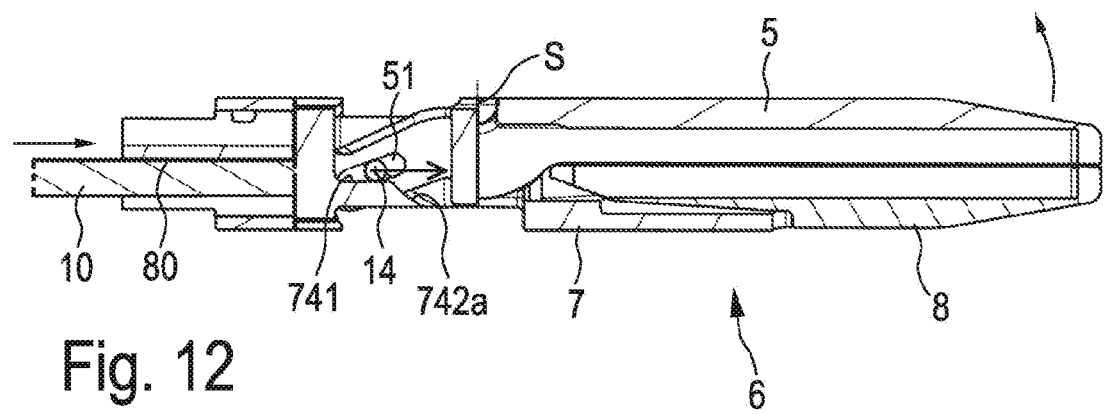
FIG. 12 shows a further sectional view of the tool device with the tool mouth closed and during a movement in the direction of the open position.

In order to open the tool mouth M starting from the closed position (FIG. 11), the operating element 9 is moved distally in a stroke movement or pivoting movement, if appropriate after the rotation lock 43 has been released beforehand. Accordingly, the push-pull element 10 moves distally along the longitudinal movement axis L'. The control pin is moved distally along the proximal surface portion 741 (FIG. 12).

Figure 13:
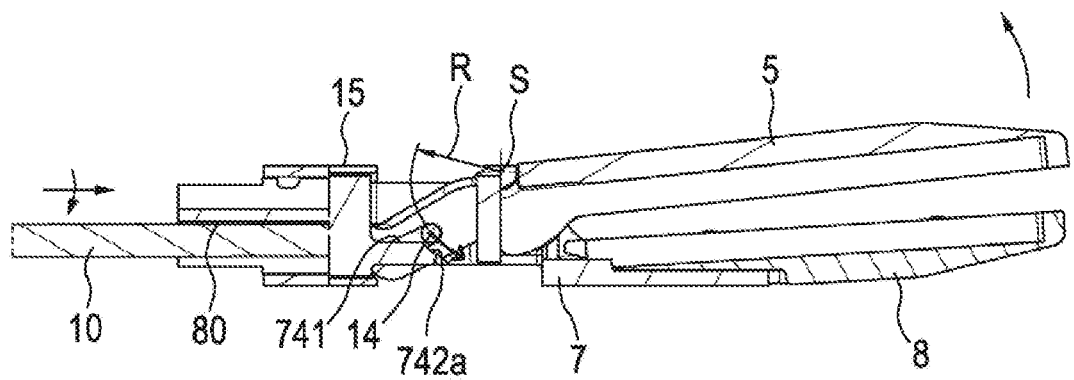
FIG. 13 shows a further sectional view in a functional position further in the direction of the open position.

A further functional position when opening the tool mouth M is shown in FIG. 13. In this position, the control pin 14 is moved further in the distal direction and is positioned at the transition between the proximal surface portion 741 and the distal surface portion 742a. At the same time, in this functional position, the control pin 14 is held at the distal groove end 512 of the control groove 51. As a result, upon further movement of the control pin 14, excessive radial play with respect to the distal surface portion 742a is suppressed.

Figure 14:
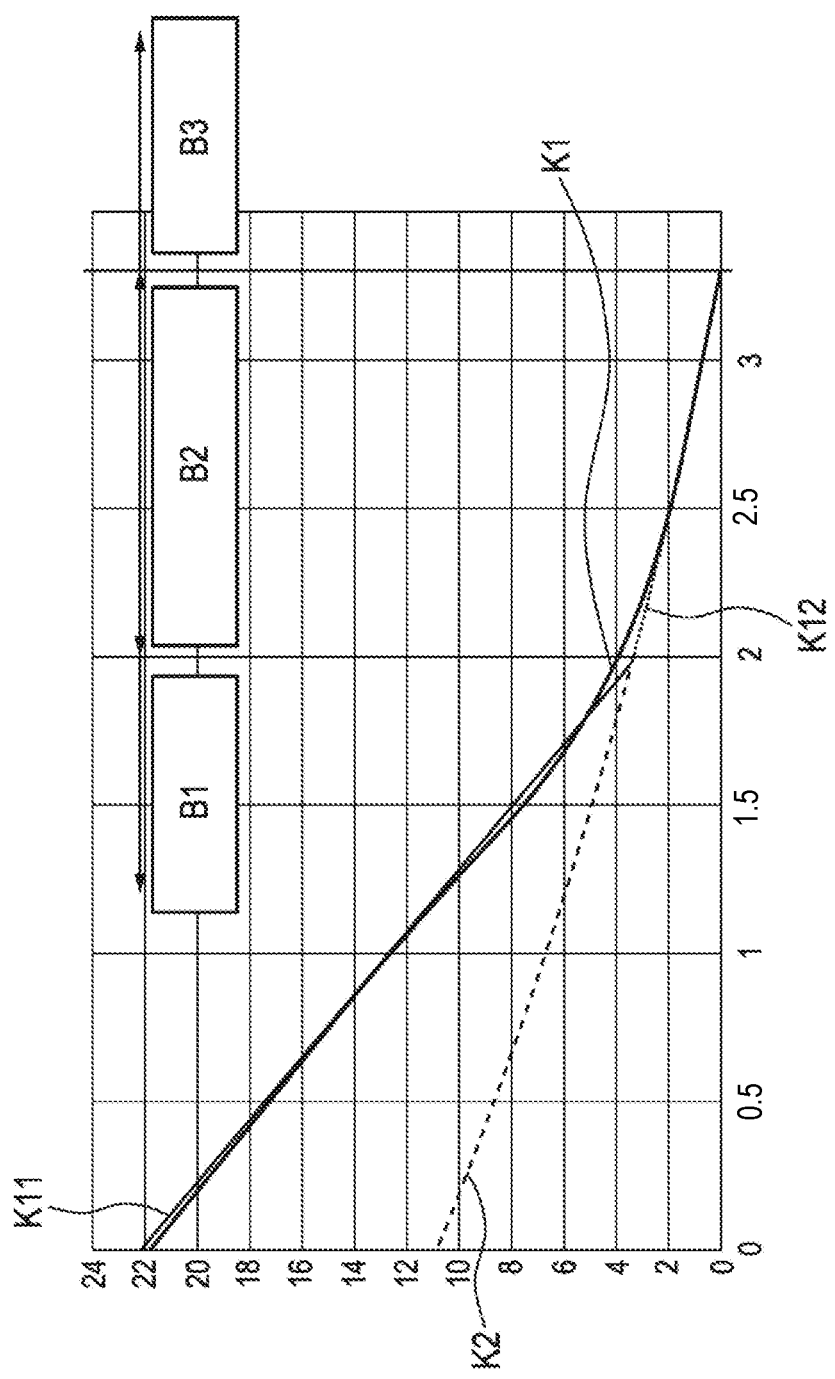
FIG. 14 shows a schematic diagram in which an opening angle of the tool mouth is plotted over an operating path of an operating element of the grip device.

FIG. 14 shows a diagram illustrating the relationship between an opening angle of the tool mouth M and the translational movement of the push-pull element 10. The latter can also be referred to as stroke and is shown on the abscissa. The unspecified opening angle of the tool mouth M is shown on the ordinate. The curve K1 indicates the course of the opening angle over the stroke for the design explained in particular with reference to FIGS. 9 to 13. The curve K1 can be subdivided approximately into two linear curve portions K11, K12. In the present case, the origin of the coordinates corresponds to the distal end position of the pin and thus to the open position of the tool mouth M (FIG. 9). The course of the curve can be subdivided into two regions B1, B2.

Starting from the distal end position of the pin, the opening angle initially has a comparatively steep incline over the stroke (curve portion K11). Here, the control pin 14 moves along the distal surface portion 742a. In the present case, the transition between the distal surface portion 742a and the proximal surface portion 741 is at approximately 2 mm stroke. With a further increase in the stroke, the control pin 14 enters the proximal surface portion 741. The profile of the opening angle then flattens out noticeably (curve portion K12).

This means that a comparatively large decrease in the opening angle is initially achieved with a comparatively small stroke (region B1). Since this region is a low force region due to the application (no build-up of clamping force), the reduction in stroke has no negative effects on the operating forces required on the operating element 9. At the transition into the region B2, the change in the opening angle decreases with the same change in the stroke. The actual build-up of the clamping force between the jaw parts 5, 6 takes place in a region B3.

As a result, the present design of the control surface 74 leads to an overall shortened stroke of the operating element 9, with a greater opening angle of the tool feature M and reduced operating forces on the operating element 9. Improved user-friendliness can be achieved in this way.

In contrast to this, a curve K2 drawn in as an example shows the profile of the opening angle over the stroke for a purely horizontal control surface. When using a purely horizontal control surface, only about half the opening angle is achieved with the same stroke. This can be seen as a disadvantage.

Method steps of a method according to the invention for producing the tool device 3 described above are illustrated schematically in FIGS. 15 to 18.

Figure 15:
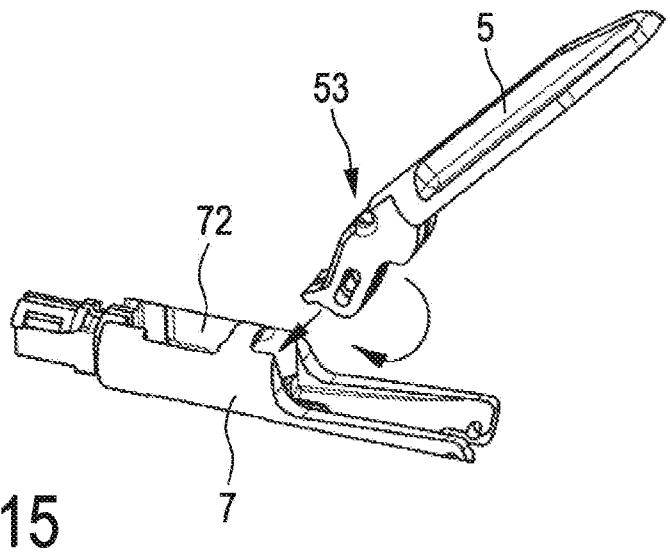
FIG. 15 shows a schematic view illustrating a method step for producing the tool device.

In a step illustrated in FIG. 15, the first jaw part 5 is inserted, with the control portion 53 first, into the receiving recess 72 of the housing portion 7. The control portion 53 is in this case guided obliquely from the top downward and in the proximal direction under the transverse web portion 78 and at the same time rotated clockwise (FIG. 15). Here, the pivot bearing surface 77 and the complementary pivot bearing surface 52 are in contact with each other, thus forming the pivot axis S. In addition, the pivot guiding surface 79 and the complementary pivot guiding surface 54 are in contact with each other. The connection formed in this way between the first jaw part 5 and the housing portion 7, which connection is pivotable about the pivot axis S on the one hand and form-fitting radially to the pivot axis S on the other hand, makes it possible in particular to dispense with a separate pin, axle or bolt connection for forming the pivot axis.

Figure 16:
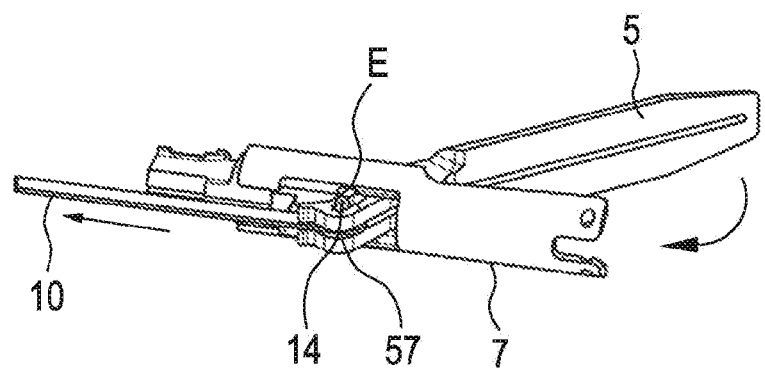
FIG. 16 shows a further schematic view illustrating a further method step.

In a further step, the push-pull element 10 is inserted into the longitudinal slot 57 of the control portion 53, and the control pin 14 is inserted along its axial direction through the control groove 51 and the receiving bore 102. This takes place when the first jaw part is maximally opened in relation to the housing portion 7, which can also be referred to as the assembly position (FIG. 16). The control pin 14 is still located outside the receiving recess 72 and in the region of an insertion opening E formed on the distal end of the control projection 71.

Starting from the assembly position, the first jaw part 5 is pivoted manually in a clockwise direction about the pivot axis such that the control pin 14, if positioned accordingly, passes through the insertion opening E into the receiving recess 72 and into the region of the control surface 74. Here, the control pin 14 is guided along its axial direction between the opposing securing surfaces 76, 76'.

In a further step (FIGS. 17, 18), the sleeve 15 is pushed in the axial direction over the push-pull element 10 and the proximal end of the housing portion 7. As a result, the push-pull element 10 is fixed in terms of its vertical mobility between an inner side (not designated in any detail) of the sleeve 15 and the longitudinal guide surface 80 of the housing portion 7. In this way, the push-pull element 10 can move as intended in a limited vertical direction between the inner side of the sleeve 15 and the longitudinal guide surface 80. The pivoting mobility of the first jaw part 5 is positively limited at one side by the stop portion 56 and the complementary stop portion 151 of the sleeve 15. This prevents the first jaw part 5 from being able to reach the assembly position (FIG. 16) beyond the open position (FIG. 17) and the control pin 14 from unintentionally exiting the receiving recess 72. In other words, the control arrangement 11 is inherently fixed by the sleeve 15.

In a next step (FIG. 19), the shaft 2 is guided in the axial direction over the push-pull element 10 and fastened to the housing portion 7. In this way, a crimped connection is formed between the housing portion 7 and the shaft 2. For this purpose, the housing portion 7 has indentations (e.g. FIG. 4), which are not designated in any more detail and which interact with tabs (without reference signs) arranged at the distal end of the shaft 2. As a result of the crimped connection, the sleeve 15 is, to put it simply, "clamped" between the shaft 2 and the housing portion 7.

In a further step, the active portion 8 of the second jaw part 6 is secured to the housing portion 7 by a further form-fit connection in the region of the tilt axis K. As FIG. 19 makes clear, the active portion 8 in the present embodiment can be tilted relative to the housing portion 7 by a few angular degrees about the tilt axis K.

Figure 19:
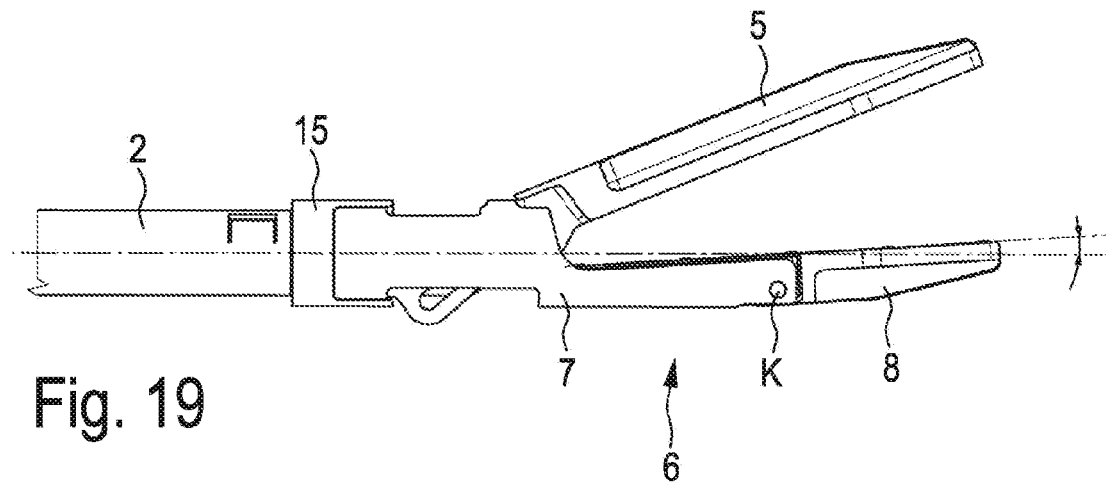
FIG. 19 shows a further schematic view illustrating a further method step relating to a mounting of the tool device at a fixed angle on the shaft.
Figure 20:
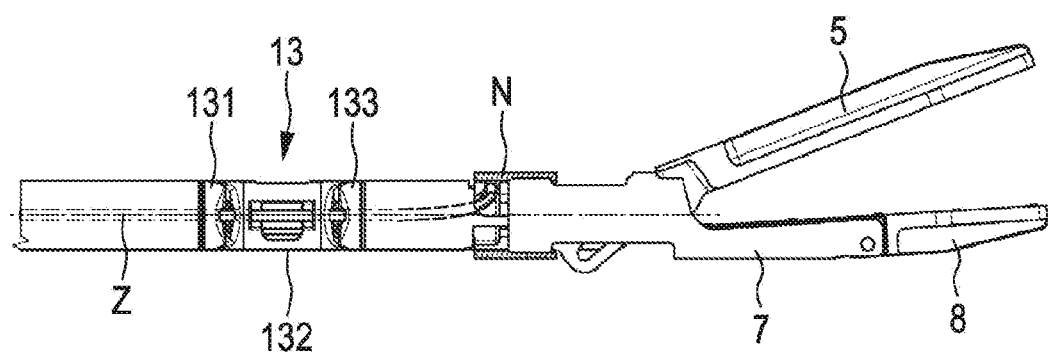
FIGS. 20 and 21 show further schematic views illustrating a further method step relating to an articulated mounting of the tool device on the shaft.
Figure 21:
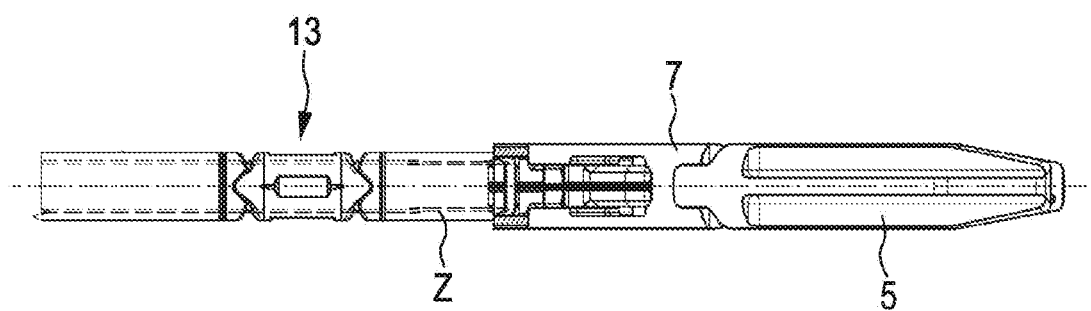

The steps illustrated in FIG. 19 relate to the variant with a tool device that cannot be bent relative to the shaft 2. The bendable variant is shown in FIGS. 20 and 21. In this variant, an articulation tension band Z is provided. The articulation tension band Z is shown in broken lines in covered regions and interacts with the operating unit 12 and the swivel unit 13 of the bending mechanism 12, 13 in a basically known manner. The articulation tension band Z runs along a groove (not shown in any detail) in the housing portion 7 and as a loop along the shaft 2. Individual swivel bodies 131, 132, 133 of the swivel device 13 allow the tool device 3 to be bent. The arrangement shown in FIGS. 20 and 21 is preferably held together exclusively by the tensile forces of the articulation tension band Z, such that no further positive connection is required to fix the arrangement. In the region of a groove N of the housing portion 7, the sleeve 15 secures the articulation tension band Z in all directions against slipping out.

The invention claimed is:

1. A surgical instrument comprising: a shaft extending along a shaft longitudinal axis; a tool device arranged distally on the shaft and having a first jaw part and a second jaw part, the first and second jaw part being pivotable relative to each other, about a pivot axis oriented transversely to the shaft longitudinal axis, to form an openable and closable tool mouth; a grip device arranged proximally on the shaft and having an operating element which is operatively connected to the tool device via a push-pull element, the push-pull element being movable in translation along a longitudinal movement axis by operation of the operating element; the tool device having a control arrangement with a control pin and at least one control groove, the at least one control groove formed on a control portion of the first jaw part, the control pin extending parallel to the pivot axis and engaging axially through the at least one control groove, and the control pin being slidably movable by a longitudinal movement of the push-pull element, between a proximal end position of the control pin and a distal end position of the control pin along the at least one control groove to apply torque to the first jaw part that acts about the pivot axis in order to open and/or close the tool mouth; the second jaw part comprising a receiving recess in which the control portion of the first jaw part is received at least in part, at least one control projection protruding inwardly from an inner wall of the receiving recess in an axial direction of the control pin and forms a control surface of the control arrangement, the control pin being slidable along the at least one control projection in a movement between the proximal and distal end positions of the control pin, the control pin being supported radially on the at least one control projection, and wherein the at least one control groove extends continuously straight between a proximal groove end and a distal groove end.

2. The surgical instrument according to claim 1, wherein the second jaw part has securing surfaces which delimit the receiving recess in the axial direction of the control pin and between which the control pin, in a movement between the proximal and distal end positions of the control pin, is positively secured against axial displacement.

3. The surgical instrument according to claim 1, wherein the second jaw part has a pivot bearing surface which, forming the pivot axis, interacts in a sliding movement with a complementary pivot bearing surface of the first jaw part.

4. The surgical instrument according to claim 3, wherein the pivot bearing surface of the second jaw part is formed by an outer circumference of a transverse web portion that engages over the receiving recess in the axial direction of the control pin.

5. The surgical instrument according to claim 3, wherein the second jaw part has a housing portion that is one-piece and an active portion mounted distally on the housing portion, the housing portion having at least the receiving recess together with the at least one control projection and/or the pivot bearing surface.

6. The surgical instrument according to claim 1, wherein the second jaw part has a pivot guiding surface which is curved and concentric with respect to the pivot axis and which interacts in a sliding movement with a complementary pivot guiding surface of the first jaw part.

7. The surgical instrument according to claim 1, wherein the second jaw part has a longitudinal guide surface which extends parallel to the longitudinal movement axis of the push-pull element and on which a complementary longitudinal guide surface of the push-pull element is at least temporarily guided slidably during the longitudinal movement of the push-pull element.

8. The surgical instrument according to claim 1, wherein a stop portion arranged and/or formed on the second jaw part is provided which, in an open position of the tool mouth, interacts positively with a complementary stop portion of the first jaw part about the pivot axis.

9. The surgical instrument according to claim 1, wherein the second jaw part is fixed in relation to the pivot axis, and wherein the first jaw part, rotates about the pivot axis relative to the second jaw part during opening and closing of the tool mouth.

10. The surgical instrument according to claim 1, wherein the control surface has a proximal surface portion and a distal surface portion that are inclined differently relative to the longitudinal movement axis in such a way that, in a movement of the control pin between the proximal and the distal end positions of the control pin, different transmission ratios between the longitudinal movement of the push-pull element and the pivoting movement of the tool mouth are achieved.

11. The surgical instrument according to claim 10, wherein the proximal surface portion extends parallel to the longitudinal movement axis.

12. The surgical instrument according to claim 10, wherein the distal surface portion is curved and concentric with respect to the pivot axis.

13. The surgical instrument according to claim 10, wherein the distal surface portion is straight and tangential to a circular arc arranged concentrically with respect to the pivot axis.

14. The surgical instrument according to claim 1, wherein the control pin, in a movement in a direction of the distal end position of the control pin, is held at least temporarily at the distal groove end of the at least one control groove and rotates together with the first jaw part about the pivot axis.

15. A tool device for a surgical instrument comprising: a first jaw part and a second jaw part, the first and second jaw parts being pivotable relative to each other, about a pivot axis, to form an openable and closable tool mouth, the tool device having a control arrangement with a control pin and at least one control groove, the at least one control groove being formed on a control portion of the first jaw part, the control pin extending parallel to the pivot axis and engaging axially through the at least one control groove, and the control pin being slidably movable between a proximal end position of the control pin and a distal end position of the control pin along the at least one control groove to apply a torque to the first jaw part, the torque acting about the pivot axis in order to open and/or close the tool mouth, the second jaw part comprising a receiving recess in which the control portion of the first jaw part is received at least in part, the tool device further comprising at least one control projection that protrudes inwardly from an inner wall of the receiving recess in the axial direction of the control pin and forms a control surface of the control arrangement, the control pin, being slidable along the at least one control projection in a movement between the proximal and distal end positions of the control pin and is supported radially on the at least one control projection, and wherein the at least one control groove extends continuously straight between a proximal groove end and a distal groove end.

16. A method for producing a tool device according to claim 15, comprising the step of primary forming of the second jaw part, wherein at least one housing portion of the second jaw part carrying the at least one control projection is provided by primary forming.

17. The method according to claim 16, further comprising the step of positively joining together the first jaw part and the at least one housing portion, wherein a pivot bearing surface of the second jaw part formed on the at least one housing portion and a complementary pivot bearing surface of the first jaw part, forming the pivot axis, are slidably movable about the pivot axis and are secured form-fittingly to each other radially with respect to the pivot axis.

\* \* \* \* \*